United States Patent

Shirataki et al.

(10) Patent No.: US 7,448,480 B2
(45) Date of Patent: Nov. 11, 2008

(54) ONE-WAY CLUTCH

(75) Inventors: Hirobumi Shirataki, Fukuroi (JP); Masanori Tateishi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 223 days.

(21) Appl. No.: 11/317,008

(22) Filed: Dec. 27, 2005

(65) Prior Publication Data

US 2006/0137955 A1    Jun. 29, 2006

(30) Foreign Application Priority Data

Dec. 27, 2004    (JP) ............................. 2004-376514

(51) Int. Cl.
F16D 41/07    (2006.01)

(52) U.S. Cl. .................... 192/41 A; 192/54.1

(58) Field of Classification Search ............... 192/54.1, 192/41 A
See application file for complete search history.

(56) References Cited

U.S. PATENT DOCUMENTS

| 2,750,019 | A | * | 6/1956 | Ferris ...................... 192/45.1 |
| 2,832,450 | A | * | 4/1958 | Wade ....................... 192/45.1 |
| 4,635,770 | A | * | 1/1987 | Shoji et al. ............... 192/41 A |
| 4,809,831 | A | * | 3/1989 | Kinoshita ................. 192/41 A |
| 4,882,941 | A |   | 11/1989 | Kinoshita |
| 4,960,189 | A | * | 10/1990 | Ogata et al. .............. 192/41 A |
| 5,000,303 | A | * | 3/1991 | Shoji et al. ................ 192/45.1 |
| 5,445,255 | A | * | 8/1995 | Rutke et al. .............. 192/45.1 |
| 5,469,949 | A | * | 11/1995 | Leitz ........................ 192/45.1 |
| 5,480,013 | A | * | 1/1996 | Fujiwara et al. .......... 192/45.1 |
| 5,607,036 | A | * | 3/1997 | Costin ..................... 192/45.1 |
| 5,758,755 | A | * | 6/1998 | Igari ......................... 192/45.1 |
| 5,979,626 | A | * | 11/1999 | Igari et al. ................ 192/45.1 |
| 6,044,947 | A | * | 4/2000 | Kinoshita ................. 192/45.1 |
| 6,068,096 | A | * | 5/2000 | Morita ...................... 192/3.29 |
| 6,125,978 | A | * | 10/2000 | Ando et al. ............... 192/41 A |
| 7,055,666 | B2 | * | 6/2006 | Nishimura et al. ....... 192/45.1 |

FOREIGN PATENT DOCUMENTS

| JP | 62-188632 | | 12/1987 |
| JP | 01120440 | A * | 5/1989 |
| JP | 8-277856 | | 10/1996 |

* cited by examiner

Primary Examiner—Ha D. Ho
(74) Attorney, Agent, or Firm—Crowell & Moring LLP

(57) ABSTRACT

A one-way clutch, for example, of a sprag or cam design is provided with a cage arranged between an outer ring and an inner ring. The cage has a flange portion extending outwardly in a radial direction. A slit is arranged at a location on a circle of the cage such that the cage is cut off to discontinue in a circumferential direction thereof. The flange portion has an outer diameter greater than an inner diameter of the outer ring. Preferably, the slit can be an opening formed upon the cut-off by working residual stresses occurred when the cage was pressed into an annular form.

6 Claims, 9 Drawing Sheets

ONE-WAY CLUTCH

FIELD OF THE INVENTION

This invention relates to a one-way clutch useful in a stator or the like of a torque converter for an automatic transmission.

DESCRIPTION OF THE BACKGROUND

In general, a one-way clutch is equipped with an outer ring and an inner ring which rotate relative to each other, and sprags or cams are wedged between the outer ring and the inner ring with rotation in only one direction but are free when rotation is in the opposite direction.

FIG. 9 is an axial cross-sectional view of a stator S equipped with a conventional one-way clutch, and illustrates an impeller 31 of the stator S, a radially-inner cylindrical part 32 of the impeller 31, and a one-way clutch 100 arranged on an inner circumferential wall of the radially-inner cylindrical part 32. Numerals 33 and 34 designate an outer ring and inner ring of the one-way clutch 100, respectively. Both of these outer and inner rings 33, 34 are axially restrained and supported by bushes 35. These bushes 35 also act as bearing tracks for needle bearings 36 arranged on opposite sides of the one-way clutch 100, respectively.

In the one-way clutch 100 shown in FIG. 9, a plurality of sprags 108 are held in place by an outer cage 101, an inner cage 107 and a ribbon spring 109. Further, numeral 37 indicates a spline groove via which the inner ring 34 is fixedly secured on a central stationary part (not illustrated) of the stator S, and sign X-X designates a central axis.

A one-way clutch is generally required to make an adequate degree of drag torque act between an outer ring and an outer cage so that the outer ring and the outer cage are caused to rotate integrally. This is to promptly transmit a motion of the outer ring to the outer cage and also to assure movements of the sprags.

It has, therefore, been a conventional practice to obtain a predetermined degree of drag torque, for example, by forming a circumferential wall of an outer cage into T-bars to hold the outer cage on an outer ring under the spring action of the T-bars or by providing the outer cage with spring members such as drag clips.

In addition, a one-way clutch of a further type is disclosed in JP-A-8-277856. In this one-way clutch, an outer cage is constructed of annular side portions, crossbars connecting the annular side portions together, and pockets (holding holes) for the arrangement of sprags. On radially-outer sides of the crossbars and at substantially central parts of the crossbars, protrusions are formed such that a circumscribed circle of the protrusions has a diameter a little greater than the diameter of the inner circumferential wall of an outer ring. The annular side portions are provided with slits to inhibit axial movements. An adequate degree of drag torque is, therefore, produced between the protrusions and the inner circumferential wall of the outer ring.

JP-A-62-188632 [U], on the other hand, discloses a cage for a one-way clutch, said cage being capable of producing a drag torque between the cage and an outer ring. The cage is formed in a shape flexed as a whole toward the inner circumferential wall of an outer ring, preferably in an elliptical shape such that at least a part of the circumferential wall of the cage is maintained in contact with the inner circumferential wall of the outer ring to use the entire cage as a spring.

The method of forming T-bars requires to partially punch holes in a flange portion and then to bend the insides of the partial holes outwardly in a radial direction, and therefore, is costly. In addition, some of the thus-bent insides of the partial holes come into contact with an outer ring to interfere with the centering of the cage. On the other hand, the method of providing the outer cage with the drag clips leads to an increase in the number of parts, thereby developing a problem that more manufacturing steps are needed.

In the one-way clutch disclosed in JP-A-8-277856, the outer cage can still be resiliently fitted in the outer ring upon fitting the outer cage in the inner circumferential wall of the outer ring even if the diameter of the circumscribed circle of the protrusions of the outer cage is a little greater than the diameter of the inner circumferential wall of the outer ring. This approach is, however, accompanied by a problem in that, as the outer cage is inserted in the outer ring while being resiliently deformed from a true circle, the thus-inserted outer cage is reduced in roundness and can provide no even drag torque. There is another problem in that the dimensional accuracy of the pockets can be hardly retained because the slits are formed at the pockets.

The one-way clutch disclosed in JP-A-62-188632 [U], on the other hand, has a compression close to 0 and can be hardly determined whether or not it has been subjected to working into an elliptical shape. It is, therefore, difficult to control its quality. Moreover, with an elliptical shape, no even drag torque acts on the whole cage as opposed to the case of a true circle, and therefore, the elliptical shape is not preferred from the functional standpoint.

SUMMARY OF THE INVENTION

With the foregoing problems in view, the present invention has as an object thereof the provision of a one-way clutch which can obtain an even drag torque between an outer ring and a cage and can be manufactured at lower cost than conventional one-way clutches.

In one aspect of the present invention, there is thus provided a one-way clutch provided with a cage arranged between an outer ring and an inner ring, said cage having a flange portion extending outwardly in a radial direction, wherein a slit is arranged at a location on a circle of the cage such that the cage is cut off to discontinue in a circumferential direction thereof, and the flange portion has an outer diameter greater than an inner diameter of the outer ring.

According to the present invention, the slit can be formed by simple working, preferably by cutting off the cage at a location subsequent to its pressing into an annular form. Accordingly, the spring constant for a radial flex of the whole cage is relatively small, and as a consequence, its insertion into the outer ring is easy and its drag torque can be controlled also with ease.

Moreover, the provision of the slit can facilitate to determine whether or not the working of the cage has been completed.

DETAILED DESCRIPTION OF PREFERRED EMBODIMENTS

The one-way clutch according to the present invention as used in a stator of a torque converter will hereinafter be described based on FIG. 1 through FIG. 8.

Figure 1:
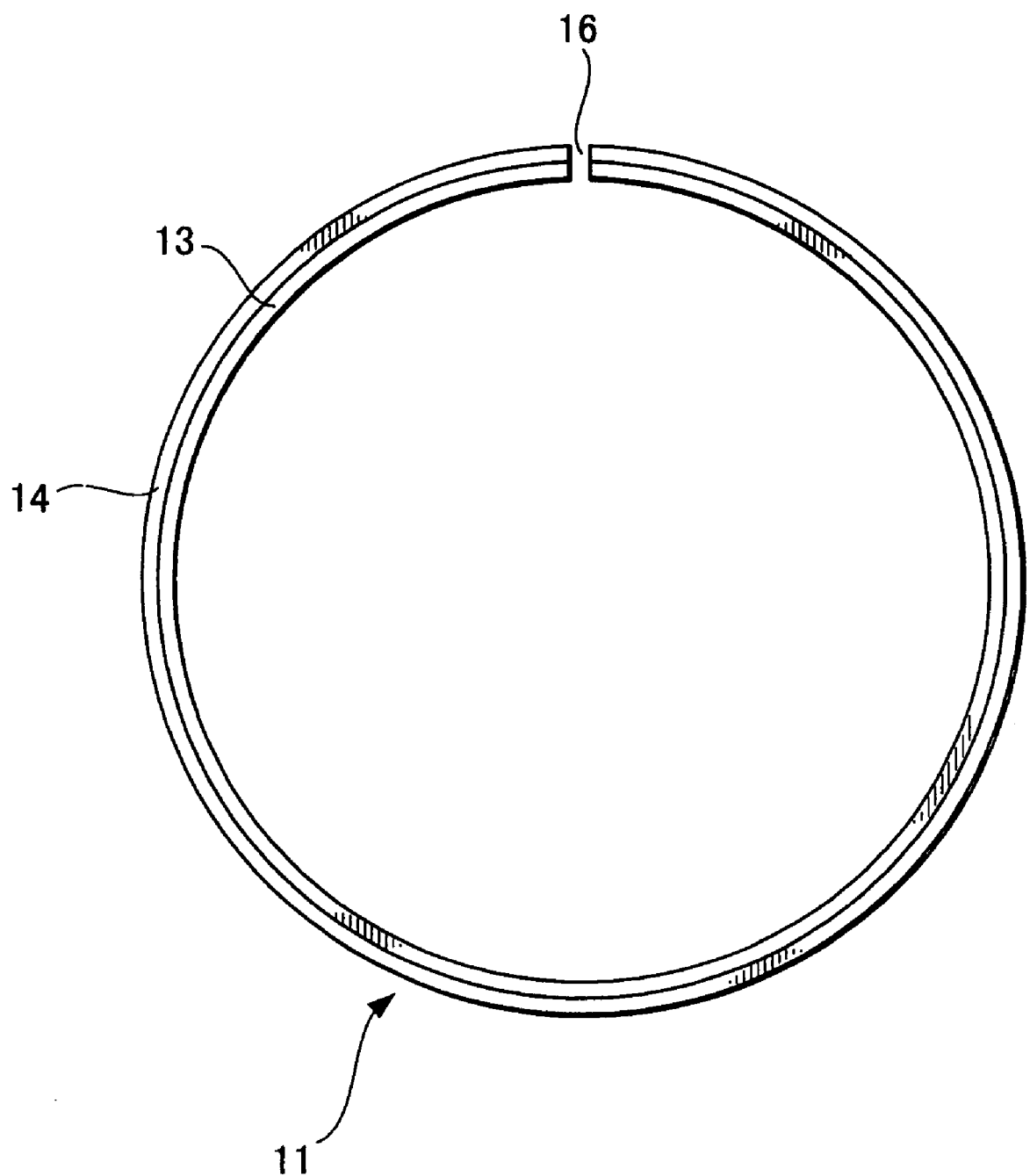
FIG. 1 is a front elevation of an outer cage for use in a double-caged, sprag one-way clutch according to a first embodiment of the present invention useful for a stator.
Figure 2:
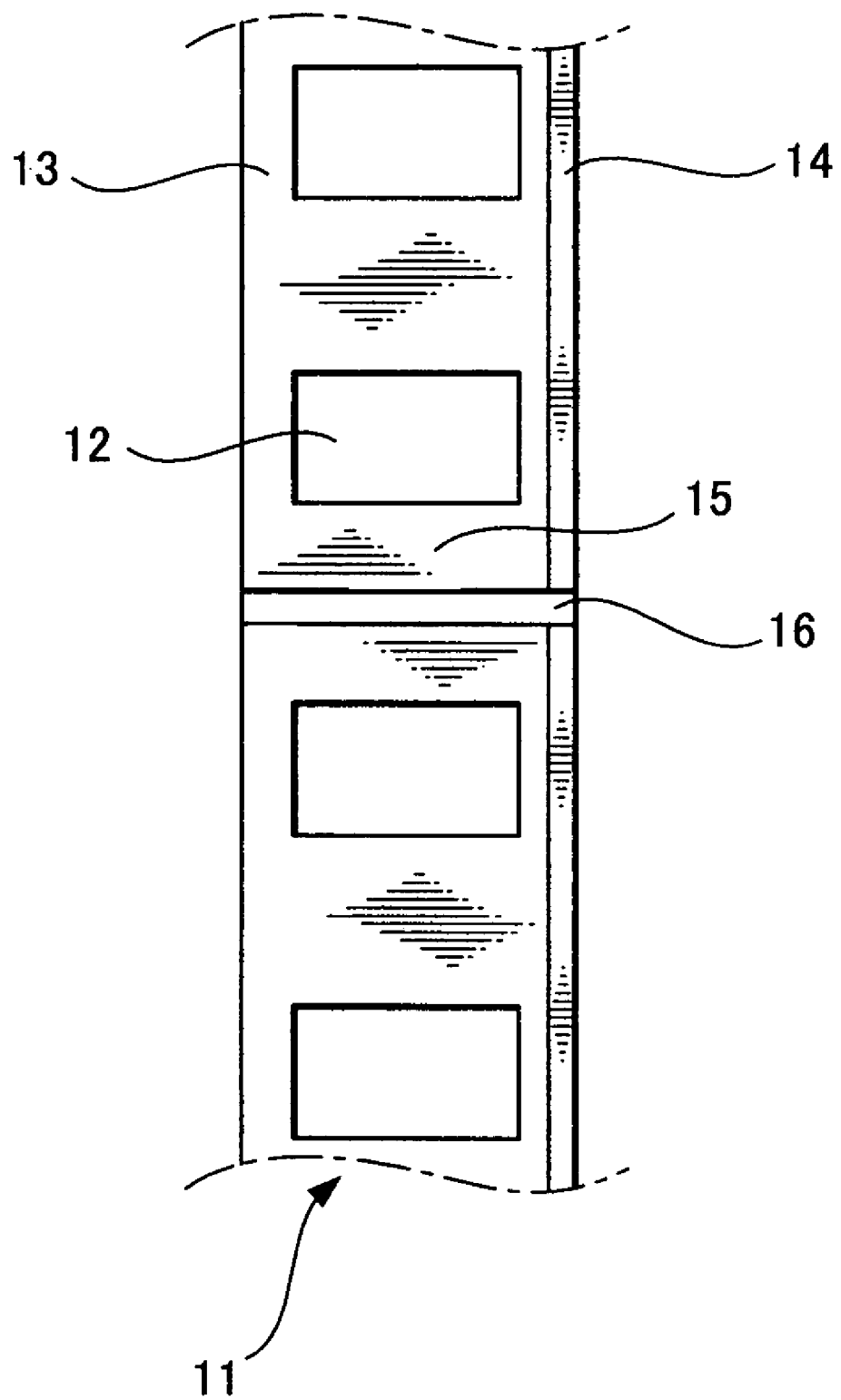
FIG. 2 is a fragmentary top plan view of the outer cage of FIG. 1.

Referring first to FIGS. 1 and 2, an outer cage 11 for use in a double-caged, sprag one-way clutch according to a first embodiment of the present invention for a stator is constructed of a cylindrical part 13 and a flange part 14 extending outwardly from one of annular edge portions of the cylindrical part 13 in a radial direction, and sprag pockets 12 are formed in the cylindrical part 13.

As illustrated in FIGS. 1 and 2, the outer cage 11 is cut off at a location of a crossbar 15 between sprag pockets 12 and 12 so that a slit 16 is formed.

Preferably, the outer cage 11 can be fabricated by drawing a sheet-like material into an annular shape on a press and then performing bottom stamping. In this case, a compression stress occurs in a circumferential direction as a working residual stress on the side of the inner circumference, while a tensile stress occurs in a circumferential direction as a working residual stress on the side of the outer circumference. When the thus-worked cage is cut off at a location on a circle of the cage, the cage opens at the cut-off location under force that acts to widen under the working residual stresses occurred when pressed into the annular form. As a result, a slit is formed at the cut-off location so that the cage is no longer continuous, in other words, discontinues in the circumferential direction of the cage.

Before the formation of the slit 16, that is, at a stage before the cut-off, the outer diameter of the flange part 14 is formed a little smaller than the inner diameter of an outer ring (not shown). After the formation of the slit 16, however, the outer diameter of the flange part 14 becomes a little greater than the inner diameter of the outer ring as a result of the opening of the flange part 14 under the above-mentioned working residual stresses. As a consequence, the outer cage 11 takes the form of a substantially true circle irrespective of the width dimension of the cut-off location after the outer cage 11 has been inserted in the outer ring.

Before the formation of the slit 16, the outer cage 11 may preferably have such an outer diameter that a clearance between the flange part 14 of the outer cage 11 and an associated raceway surface of the outer ring falls within a range of from 0.03 mm to 0.2 mm.

Figure 3:
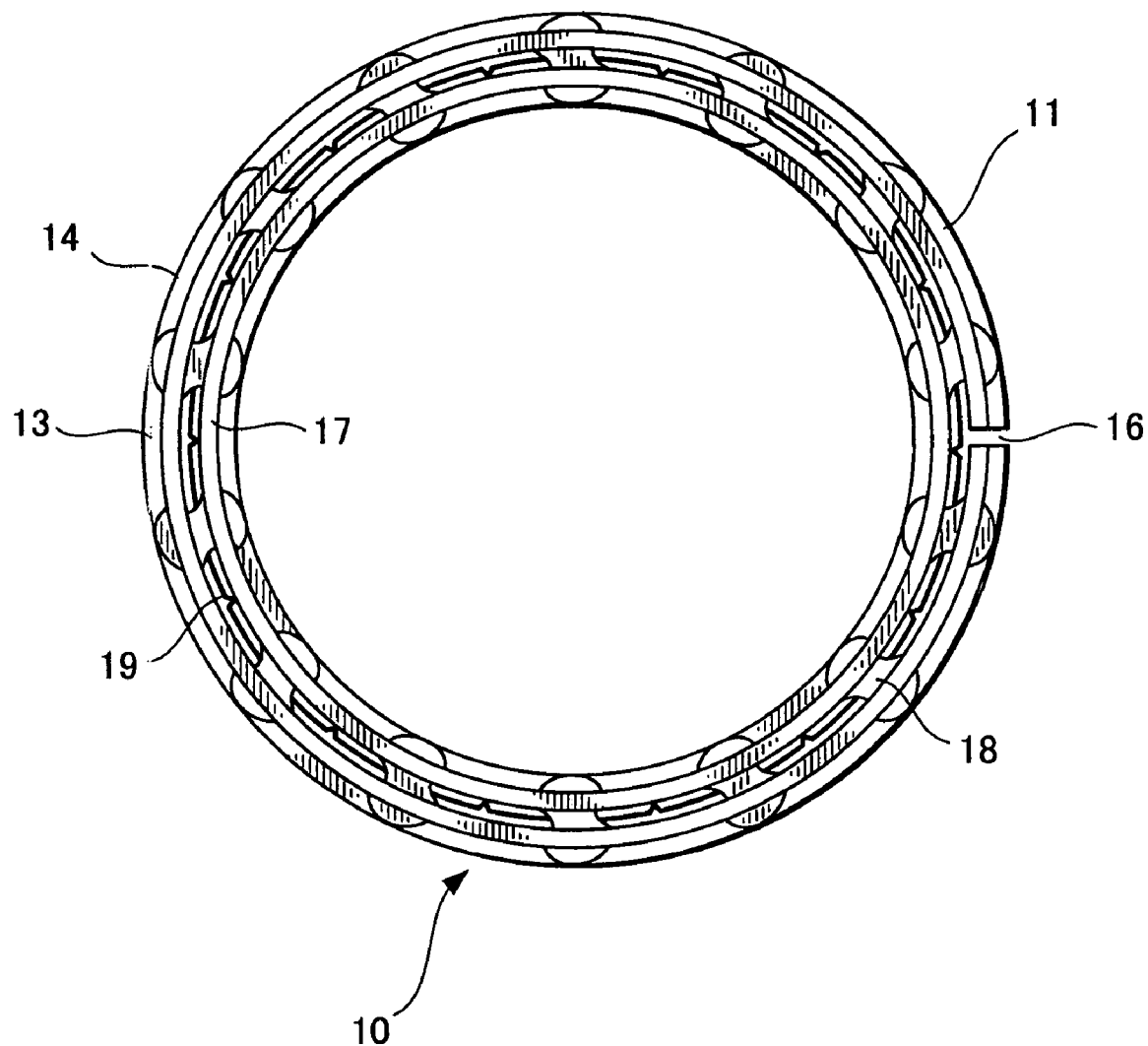
FIG. 3 is a front elevation of the double-caged, sprag one-way clutch according to the first embodiment of the present invention useful for the stator.
Figure 4:
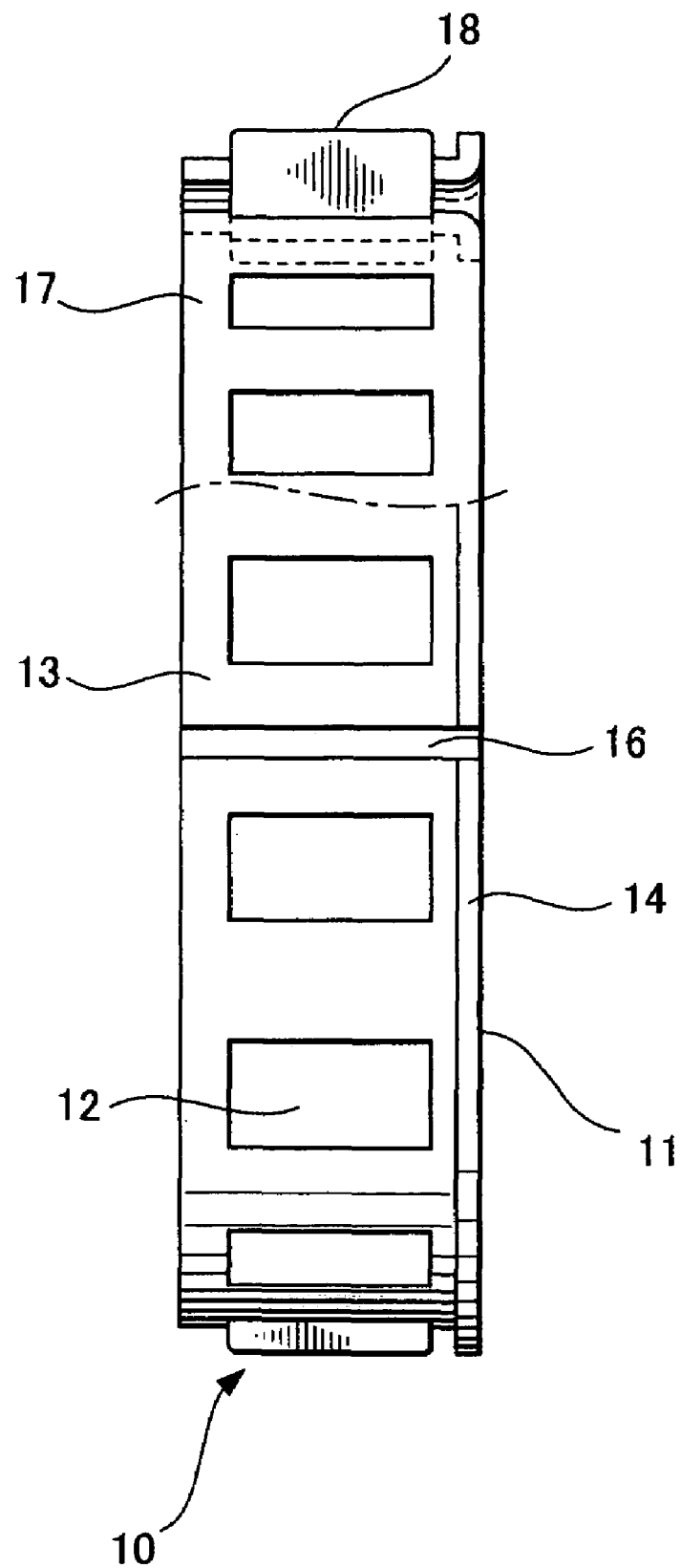
FIG. 4 is a fragmentary side view of the double-caged, sprag one-way clutch of FIG. 3.

Referring next to FIGS. 3 and 4, a description will be made of the double-caged, sprag one-way clutch according to the first embodiment of the present invention. The one-way clutch according to the first embodiment of the present invention comprises the outer cage 11 depicted in FIG. 1, an inner cage 17, plural sprags 18 arranged between the outer ring and an inner ring (both, not shown) to effect torque transmissions, and a ribbon spring 19 biasing the sprags 18 in a wedging direction.

Upon inserting the one-way clutch 10 of FIG. 3 into the outer ring, the outer cage 11 is resiliently deformed to close the slit 16 and as a result, the one-way clutch 10 can be easily inserted, because the outer diameter of the flange part 14 before the formation of the slit 16 was a little smaller than the inner diameter of the outer ring and the spring constant for a radial flex of the whole outer cage 11 is relatively small owing to the arrangement of the slit 16 formed as a result of the opening of the cut-off location under the working residual stresses occurred at the time of the cut-off.

Subsequent to the insertion of the one-way clutch 10 into the outer ring, the slit 16 opens again so that the flange part 14 of the outer cage 11 expands in the form of a substantially true circle against the raceway surface of the outer ring. As a result, the outer cage 11 takes as a whole the form of a substantially true circle, and therefore, an even drag torque is obtained over the entire area of contact between the one-way clutch 10 and the outer ring.

As mentioned above, the outer diameter of the flange part 14 before the formation of the slit 16 of the outer cage 11 can be set preferably such that the clearance between the flange part 14 and the raceway surface of the outer ring falls within the range of from 0.03 mm to 0.2 mm. Insofar as this condition is met, the flange part 14 of the outer cage 11 takes the form of a substantially true circle when assembled in the outer ring.

Figure 5:
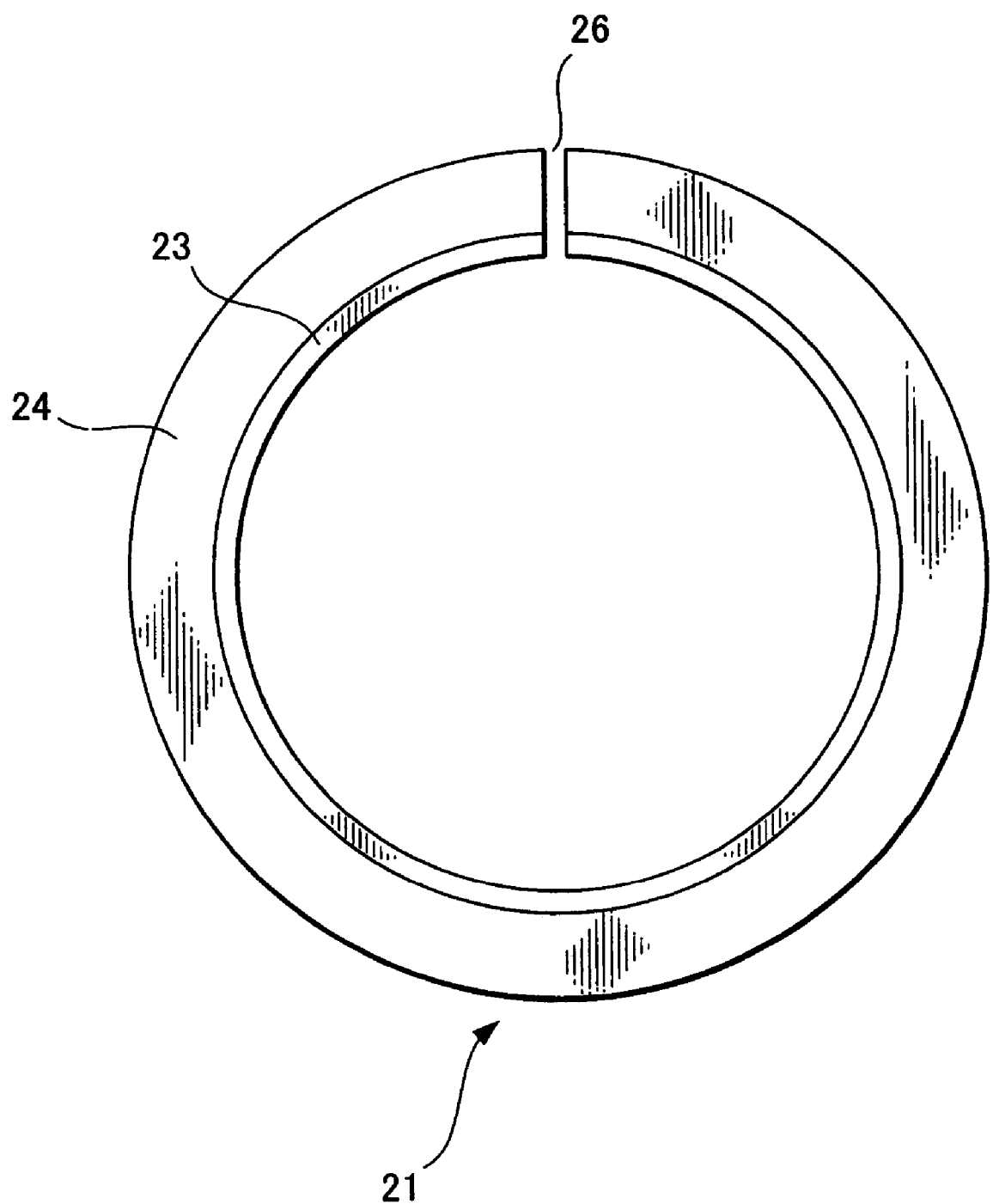
FIG. 5 is a front elevation of a cage for use in a single-caged, cam one-way clutch according to a second embodiment of the present invention useful for a stator.
Figure 6:
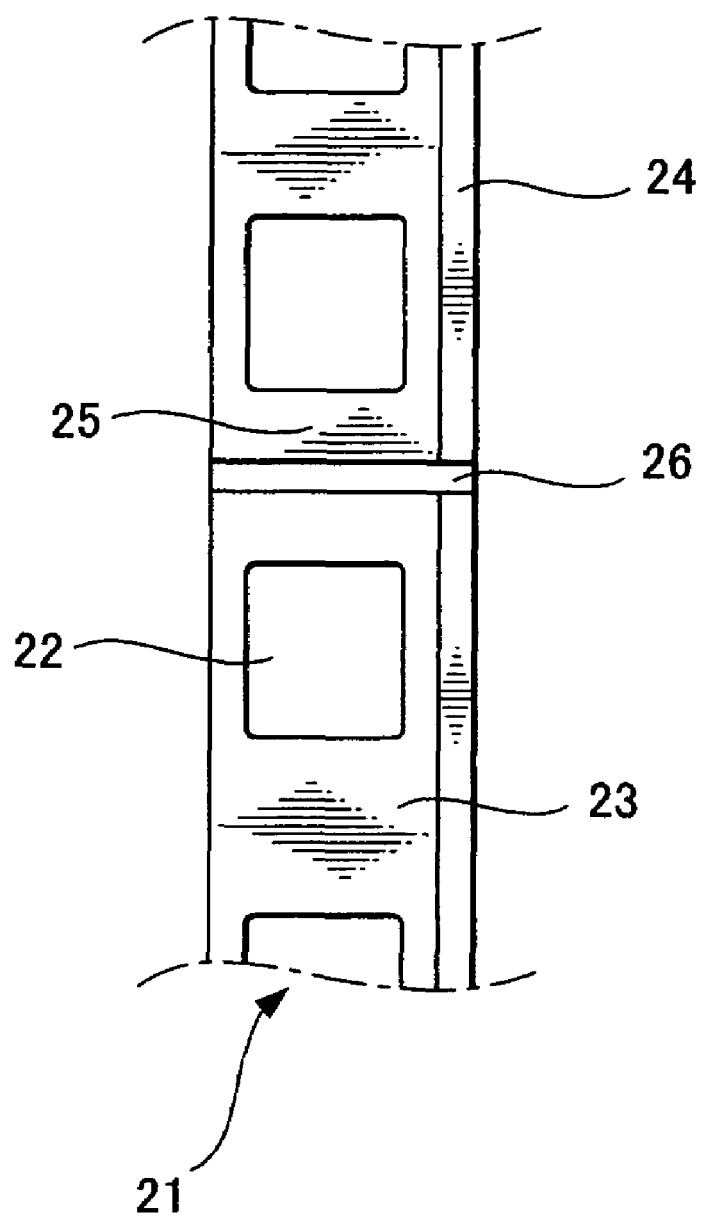
FIG. 6 is a fragmentary top plan view of the cage of FIG. 5.

With reference to FIGS. 5 and 6, a description will now be made of a cage 21 for use in a single-caged, cam one-way clutch according to the second embodiment of the present invention. As shown in FIG. 5, the cage 21 is constructed of a cylindrical part 23 and a flange part 24 extending outwardly from one of annular edge portions of the cylindrical part 23 in a radial direction, and sprag pockets 22 are formed in the cylindrical part 23.

Figure 7:
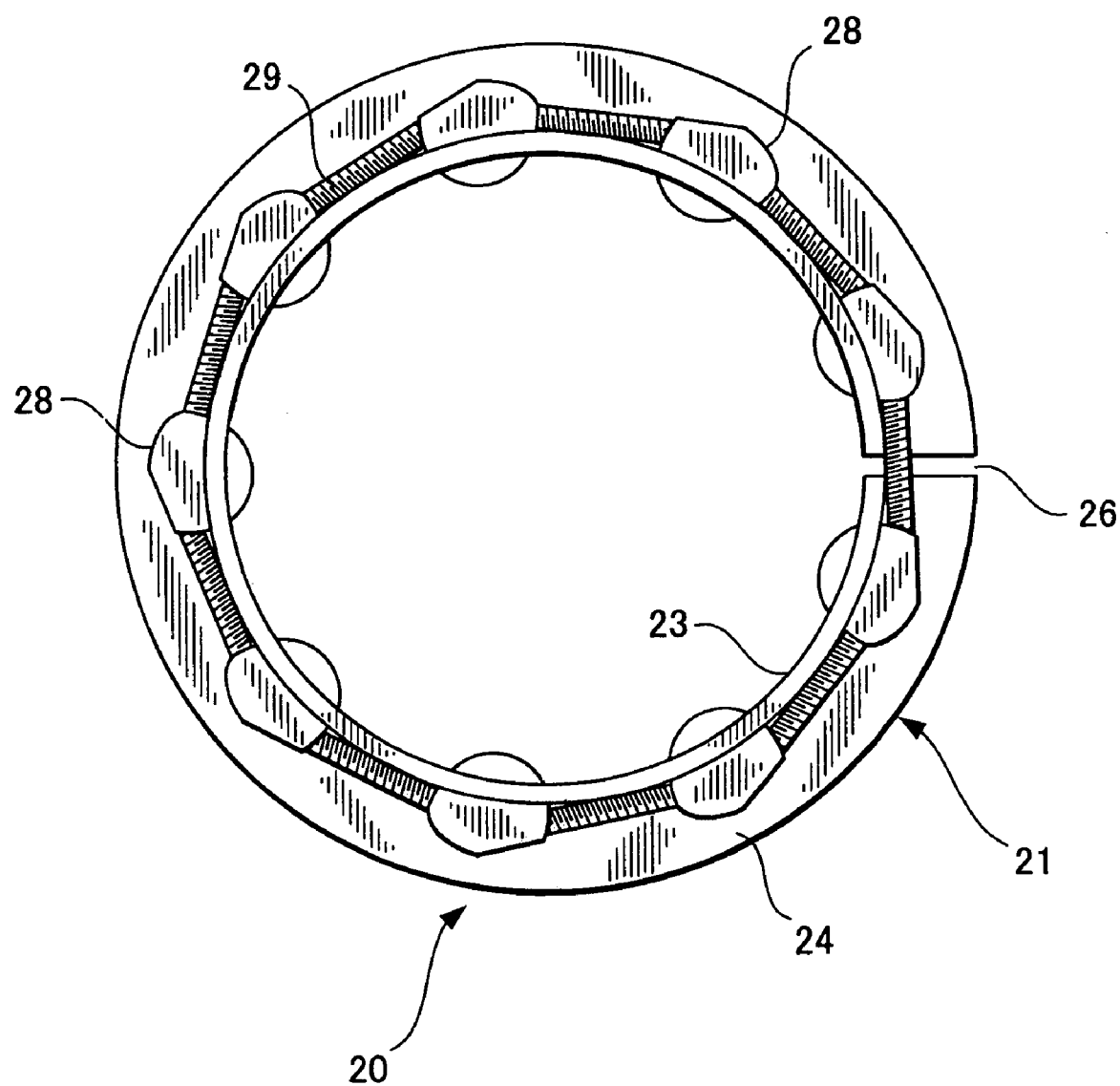
FIG. 7 is a front elevation of the single-caged, cam one-way clutch according to the second embodiment of the present invention useful for the stator.
Figure 8:
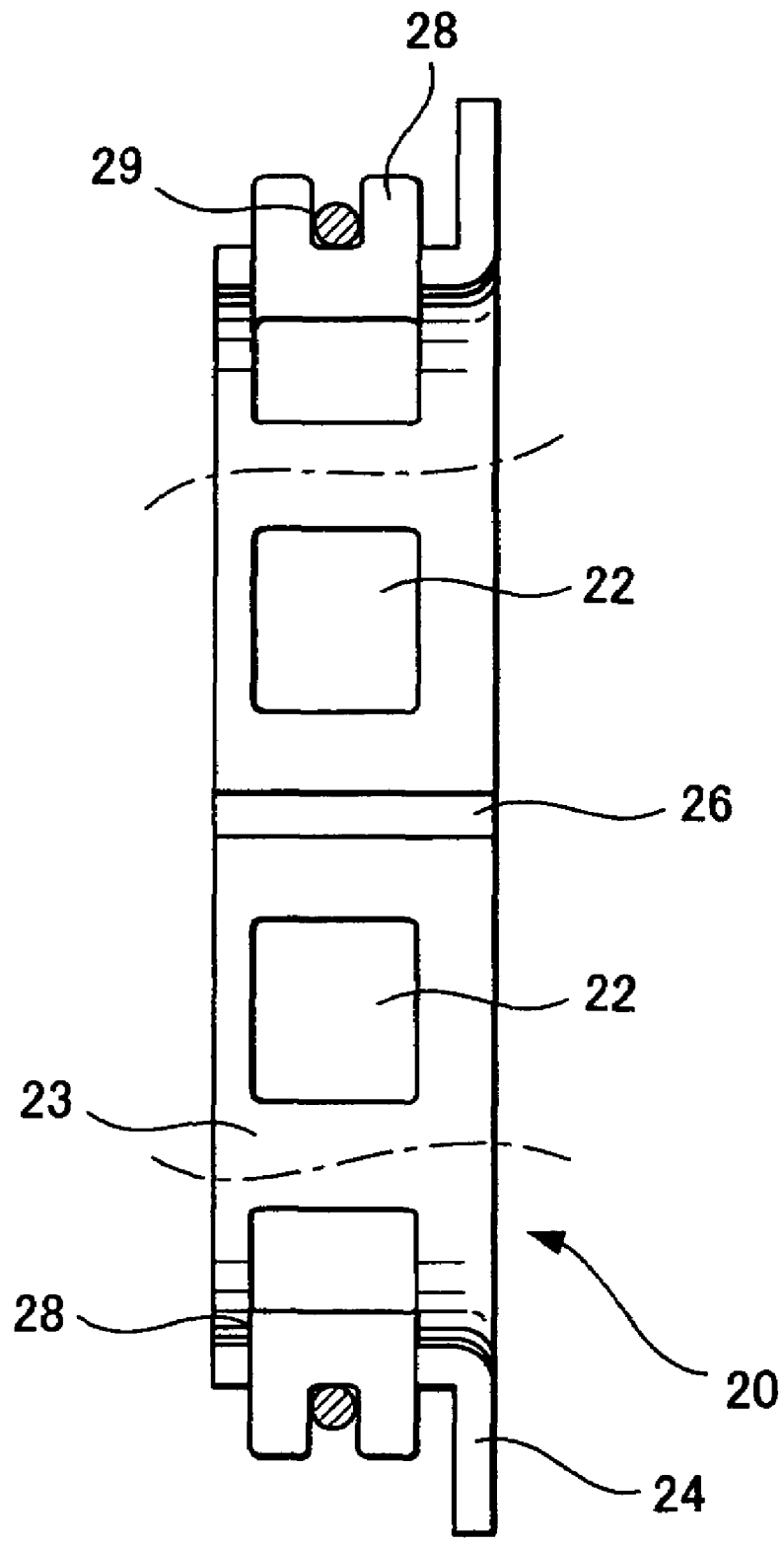
FIG. 8 is a fragmentary side view of the single-caged, cam one-way clutch of FIG. 7.
Figure 9:
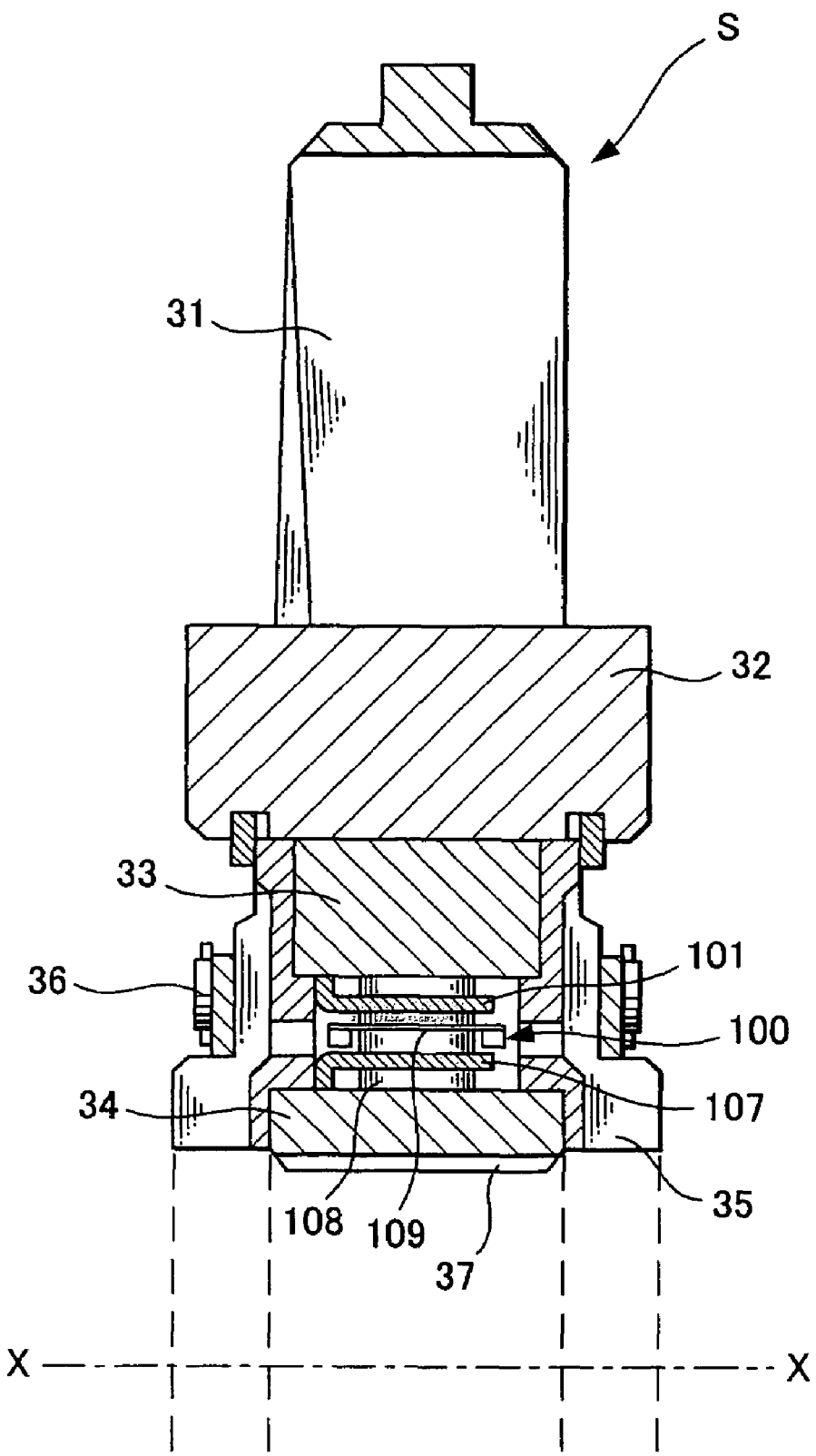
FIG. 9 is a schematic cross-sectional view showing a one-way clutch as assembled in a stator of a torque converter of an automatic transmission.

FIG. 7 is a front elevation of the single-caged, one-way cam clutch 20 according to the second embodiment of the present invention, and FIG. 8 is a fragmentary side view of the single-caged, one-way cam clutch 20 of FIG. 7. As depicted in FIGS. 7 and 8, the single-caged, one-way cam clutch 20 according to the second embodiment of the present invention comprises the cage 21 shown in FIG. 5, plural cams 28 arranged between an outer ring and an inner ring to perform a torque transmission, and a coil spring 29 for biasing the cams 28 in an engaging direction.

As illustrated in FIGS. 5 and 6, the cage 21 is cut off at a location of a crossbar 25 so that a slit 26 is formed as in the first embodiment.

As in the first embodiment, the slit 26 can be formed preferably by pressing a sheet-like material into an annular shape and then cutting off the thus-worked cage at a location on a circle thereof such that the cut-off location opens under working residual stresses occurred at the time of the pressing. The outer diameter of the flange part 24 before the formation of the slit 26 and advantageous effects available upon insertion of the cage 21 into the outer ring are similar to those described above in connection with the first embodiment, and therefore, their description is omitted herein.

As described above, in the one-way clutch according to the present invention, the slit is arranged at a location on the circle of the cage such that the cage is cut off to discontinue in the circumferential direction thereof, and the flange portion has an outer diameter a little greater than the inner diameter of the associated outer ring. Preferably, the slit can be formed by pressing a sheet-like material beforehand into an annular shape such that the flange part of the resulting cage has an outer diameter smaller than the inner diameter of the associated outer ring, and then cutting off the thus-worked cage such that the cut-off location opens under working residual stresses occurred at the time of the pressing. As a consequence, the insertion of the cage into the outer ring can be performed without difficulty.

A predetermined drag torque can be readily obtained by the simple steps of controlling the outer diameter of the flange portion and cutting off the cage at a location thereof. Compared with conventional one-way clutches, the one-way clutch according to the present invention can be manufactured at lower cost and with more stable quality.

The present invention can be applied not only to one-way clutches for stators but also to caged one-way clutches, especially caged, sprag or cam one-way clutches for automatic transmissions, engine stators, general industrial applications or the like.

The present invention can be applied not only to

This application claims the priority of Japanese Patent Application 2004-376514 filed Dec. 27, 2004, which is incorporated herein by reference.

The invention claimed is:

1. A one-way clutch having an outer ring and an inner ring, comprising:
   a cage arranged between the outer ring and the inner ring, the cage having a cylindrical part and a flange part extending radially outwardly from an annular edge of the cylindrical part, the flange part having an outer diameter greater than an inner diameter of the outer ring;
   pockets operatively arranged in the cylindrical part of the cage; and
   wherein the cage comprises only one slit arranged at a circumferential location, the slit extending completely through the cylindrical part and flange part to discontinue the cage in the circumferential direction, the only one slit extending through the cylindrical part at a location between adjacent ones of said pockets and not extending into said pockets.

2. The one-way clutch according to claim 1, wherein before forming the slit, the outer diameter of the flange part of the cage is less than the inner diameter of the outer ring.

3. The one-way clutch according to claim 2, wherein a clearance amount between the outer diameter of the flange part before the slit is formed and the inner diameter of the outer ring is between 0.03 mm to 0.2 mm.

4. The one-way clutch according to claim 1, wherein upon forming the slit extending axially through the cage at the circumferential location, an opening is formed due to relief of working residual stresses built-up in the cage.

5. A one-way clutch according to claim 1, which is a sprag one-way clutch.

6. A one-way clutch according to claim 1, which is a cam one-way clutch.

* * * * *